United States Patent [19]
Woollam

[11] Patent Number: 5,016,544
[45] Date of Patent: May 21, 1991

[54] ROAD/RAIL POWER UNIT

[75] Inventor: Ronald F. Woollam, New Glasgow, Canada

[73] Assignee: Her Majesty the Queen in right of Canada, as represented by the Minister of Highways and Transportation, Saskatchewan, Canada

[21] Appl. No.: 419,189

[22] Filed: Oct. 10, 1989

[30] Foreign Application Priority Data

Sep. 15, 1989 [CA] Canada .................................. 611565

[51] Int. Cl.⁵ ............................................. B61F 13/00
[52] U.S. Cl. ............................... 105/215.2; 105/72.2; 105/82
[58] Field of Search ................... 105/72.2, 73, 75, 82, 105/164, 198, 199.3, 209, 215.1, 215.2

[56] References Cited

U.S. PATENT DOCUMENTS

| | | | |
|---|---|---|---|
| 1,937,532 | 9/1931 | Ronk | 105/72.2 |
| 2,128,072 | 11/1935 | Brecht | 105/75 |
| 2,655,873 | 10/1953 | McDonald | 105/215.2 |
| 3,286,657 | 11/1966 | Browne | 105/215.2 |
| 3,342,141 | 5/1965 | Browne | 105/215.2 |
| 3,628,465 | 12/1971 | Dobson et al. | 105/164 |
| 3,704,671 | 12/1972 | Horne et al. | 104/242 |
| 4,048,925 | 9/1977 | Storm | 105/72.2 |
| 4,372,220 | 2/1983 | Sechi | 105/215.2 |
| 4,809,798 | 3/1989 | Moist et al. | 180/19.1 |

FOREIGN PATENT DOCUMENTS

| | | |
|---|---|---|
| 630018 | 10/1961 | Canada . |
| 639867 | 4/1962 | Canada . |
| 932354 | 8/1973 | Canada . |
| 1203554 | 4/1986 | Canada . |

Primary Examiner—Matthew C. Graham
Assistant Examiner—S. Joseph Morano
Attorney, Agent, or Firm—Biebel, French & Nauman

[57] ABSTRACT

This invention relates to a convertible road/rail power vehicle including a tractor unit provided with retractable wheel sets and rail equipment that enable it to be operated on either highways or railway tracks and when on rail to pull a multiplicity of loaded or unloaded railway cars.

24 Claims, 11 Drawing Sheets

ROAD/RAIL POWER UNIT

BACKGROUND OF THE INVENTION

This invention relates to a convertible road/rail power vehicle including a tractor unit provided with retractable wheel sets and rail equipment that enable it to be operated on either highways or railway tracks and when on rail to pull a multiplicity of loaded or unloaded railway cars.

The prior art has provided various forms of vehicles capable of being operated on either a highway or on a railway track. Vehicles which operate on both road and rail fall primarily into two main categories. In the first category are highway vehicles fitted with special rail dollies (two of which are known by the "Hy-Rail" and "HABCO" trademarks) which enable them to also operate on rail. The dollies, when lowered into operating position, take only that portion of the vehicle weight needed to provide adequate guidance. Sufficient weight is left on the vehicle's normal drive wheels to permit propulsion of the vehicle through its normal highway drive train. In this instance, the vehicles usually provide propulsion for their own movement only and do not pull any other vehicles. They are generally for rail service and maintenance operations which require vehicles for movement of material and personnel to and from work sites not reachable by road, as well as cranes and other service vehicles. Applicant is not presently aware of any in this category with the intended use of moving rail cars in revenue service.

The second category of vehicles which operate on rail and road includes those used for shunting rail cars at industrial plants and sidings. In this case, they are primarily designed for rail operation with the capability of providing high tractive effort for low speed shunting operations, but they are also fitted with retractable rubber wheel sets which permit them to operate on the ground in moving from one shunting operation to another. They are basically not designed or suitable for operation over highways at highway speed. Also, their capability of pulling strings of cars during shunting operations is not comparable to revenue train operation. While some do have brake systems that permit the application and release of train brakes, they do not have the sophisticated control necessary for mainline operation.

SUMMARY OF THE INVENTION

The road/rail power vehicle of the present invention provides for operation on highways at highway speeds, for pulling trains on the mainline at substantial speeds (e.g. up to 25 mph) and for switching and shunting rail cars at rail yards and industrial sidings. A preferred form of the invention incorporates a highway tractor unit with an extended frame fitted with retractable wheel sets which, when raised and lowered in various combinations, allows the power vehicle to perform on road or on rail in the intended manner.

Accordingly the invention in one aspect provides a convertible road/rail power vehicle including a vehicle frame with groups of road wheels and rail wheels mounted to the vehicle frame for road use and rail use respectively. A multiplicity of the wheels of these groups are movable between one position wherein the weight of the vehicle is carried by the rail wheels when in a rail mode of operation and another position wherein the vehicle weight is carried by the road wheels in the road mode of operation. Certain of the rail wheels comprise rail drive wheels and, likewise, certain of the road wheels comprise road drive wheels. A drive engine and a power transmission system are selectively connectible to either the rail drive wheels or the road drive wheels. The rail drive wheels are located sufficiently close to the longitudinal center of gravity of the vehicle as to enable a substantial amount of the total vehicle weight to be applied to the rail drive wheels as to enable them to provide the required amount of tractive effort.

In a preferred form of the invention fluid (pneumatic or hydraulic) activated suspension means are provided for moving at least the rail wheels between a retracted position wherein the vehicle weight is carried by the road wheels and an extended position wherein the vehicle weight is carried by the rail wheels.

In accordance with one aspect of the invention means are provided for varying the amount of force applied to the rail drive wheels when in contact with the rails to increase or decrease the total loading on such wheels and the tractive effort they are capable of providing.

In a preferred form of the invention the rail wheels include sets of front and rear rail wheels with the rail drive wheels located between the front and rear rail wheels. Fluid activated suspension means for the various wheels are provided to permit selected proportions of the vehicle weight to be borne by each of the sets of front and rear rail wheels and the rail drive wheels.

As a further feature of the invention, leveling or height control valves are associated with the front and rear rail wheel sets to permit selected proportions of the vehicle weight to be borne by these rail wheel sets as the amount of vehicle weight carried by the rail drive wheels is varied. Preferably, the rail drive wheels are located approximately at the center of gravity of the entire vehicle with the front and rear rail wheel sets being positioned to permit them to share approximately equal proportions of the vehicle weight.

The rail drive wheels are preferably provided with solid rubber tires to enhance the tractive effort these wheels are capable of providing. The above-noted fluid activated suspension means permits the loading applied to the rail drive wheels to be increased when maximum tractive effort is required, as at start-up, and thereafter decreased when maximum tractive effort is no longer required thereby to avoid overheating and excessive wear of the solid rubber tires.

The suspension systems typically employ air springs (e.g. air bag arrangements), the same being readily available commercially and being readily controllable thereby to provide the special effects noted above.

The importance of the systems noted above will be more fully appreciated when it is realized that the vehicle, when operating on the highway, must comply with highway codes and must therefore not exceed the permissible axle loads. The permissible axle loadings, in turn, establish the maximum gross vehicle weight. When operating on the railway, however, there is the requirement that the drive wheels be capable of providing the maximum tractive effort needed especially at start-up and when operating on grades and/or on wet rails. The restrictions and requirements imposed by the two modes of use have given rise to the various features of the invention as noted above.

In accordance with a further aspect of the invention there is provided an improved form of railway bogie for use in the road/rail vehicle noted above. At least one of the rail wheel axle sets (preferably both the front and rear rail wheel and axle sets) is mounted to the vehicle frame by this bogie which permits the rail wheel and axle set to be raised and lowered to provide the road use and rail use modes respectively. When the bogie is lowered into its operating position it acts to carry the vertical loadings of the vehicle and loadings due to brake forces, as well as to provide sufficient degrees of freedom for movements due to bounce, roll, pitch and track twist. The bogie typically includes side frames having bearings journalling opposing ends of the associated wheel and axle set. Pivot means transverse to the vehicle frame are provided to allow the side frames to pivot and move the rail wheel and axle set between the raised and lowered position. Further pivot means are provided to permit the side frame means and the attached rail wheel and axle set to pivot about a longitudinal axis relative to the vehicle frame. Pivot or drag link means interconnected between the vehicle frame and the bogie help to stabilize the bogie relative to the vehicle frame. Suspension springs acting between portions of the vehicle frame and the above-noted side frames transmit vehicle weight to the wheel and axle set.

Further features of this unique railway bogie are set forth in the following disclosure and appended claims.

A still further aspect of the invention provides improved suspensions for the rail and road drive wheels and axle. The drive wheels are of course mounted to opposing ends of a drive axle including an intermediate gear housing. (As noted previously a drive engine is operatively connected via transmission and drive shaft means to the drive axle gear housing). The suspension for each drive axle typically includes a pair of laterally spaced rearwardly extending beams pivotally connected at their forward ends to the vehicle frame for generally vertical swinging motion. An air spring forming part of the previously noted fluid activated suspension means is interposed between the trailing ends of the beams and the vehicle frame. Each drive axle has a pivotal connection with the beams intermediate the forward and trailing ends thereof. One aspect of the invention provides a torque arm assembly located above and spaced from the above-noted beams and pivotally connected between respective drive axles and the vehicle frame. The torque arm assembly is so arranged as to react torque loadings on the drive axle both longitudinally and transversely of the vehicle frame while at the same time permitting the drive axle to be raised and lowered as the above-noted beams pivot about their forward ends.

Each torque arm assembly is preferably in a "wishbone" configuration incorporating a pair of arms having their forwardly disposed ends connected to the vehicle frame at laterally spaced apart pivot points with the arms converging towards each other rearwardly and being connected to the drive axle at a pivot point or points substantially spaced above the pivotal connection between the beams and the drive axle. The arrangement is such that as the drive axle is raised and lowered, the angular position of the drive axle and its gear housing remains approximately constant. A further aspect of the invention provides forwardly extending lever arms fixed to each of the above-noted beams with further fluid actuated means disposed between these lever arms and the vehicle frame and arranged to pivot the beams to raise the drive axles and the road or rail drive wheels as the case may be.

Further features of the invention will be apparent from the following description of a preferred embodiment when read in conjunction with the appended drawings.

DETAILED DESCRIPTION OF PREFERRED EMBODIMENT

The road/rail power vehicle 10 is a hybrid highway tractor unit modified with retractable wheel sets and rail equipment that enables it to be operated on either highways or standard gauge railway tracks and when on rail to pull up to five (5) loaded or fifteen (15) empty one hundred ton railway hopper cars at speeds up to 25 mph. In grade operation, the unit is capable of pulling up to five loaded hopper cars at 5 mph on a 1.5% grade of one mile in length.

The power vehicle 10 is fitted with standard railway couplers 12 on both ends to facilitate switching and marshalling operations in yards and sidings, but for normal rail operations it is intended to run cab forward and to pull the rail car consist from the rear coupler.

It is important to note that the vehicle 10, when operating on the highway, must comply with highway codes and must therefore not exceed the permissible axle loads. The permissible axle loadings will vary from one jurisdiction to another. However, the general principles outlined here are applicable to all jurisdictions and those skilled in the art will be able to make the necessary modifications as to ensure maximum performance without exceeding permissible axle loadings.

Figure 1:
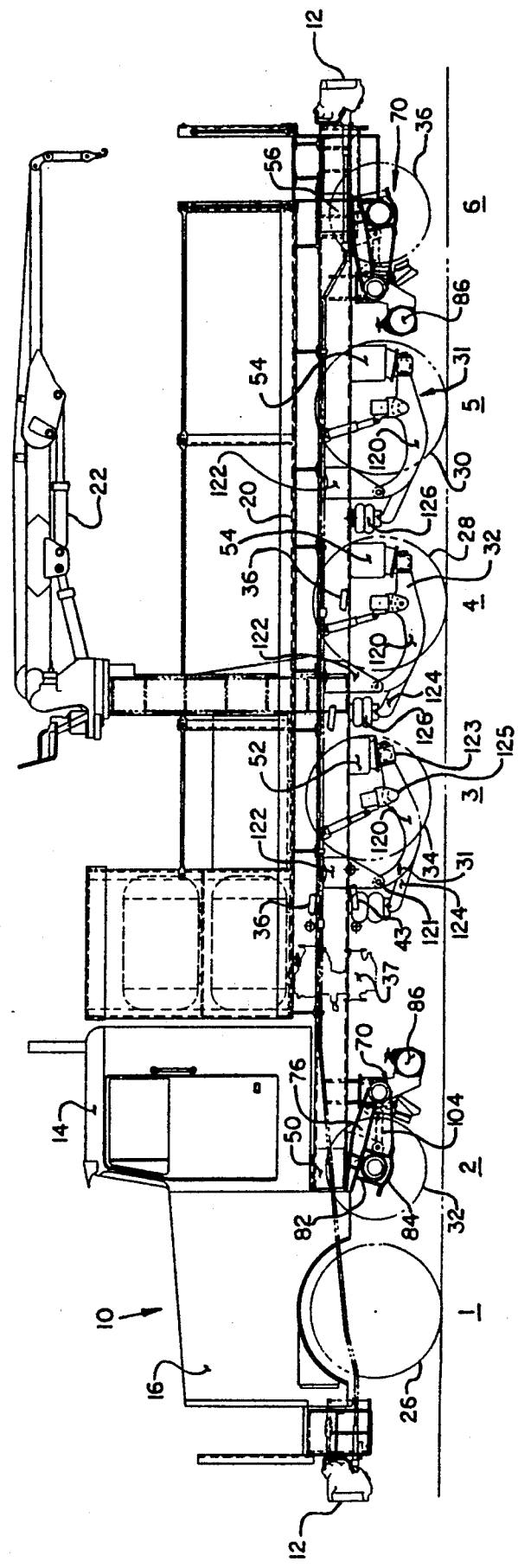
FIG. 1 is a side elevation view of a road/rail power vehicle in accordance with a preferred embodiment of the invention.
Figure 2:
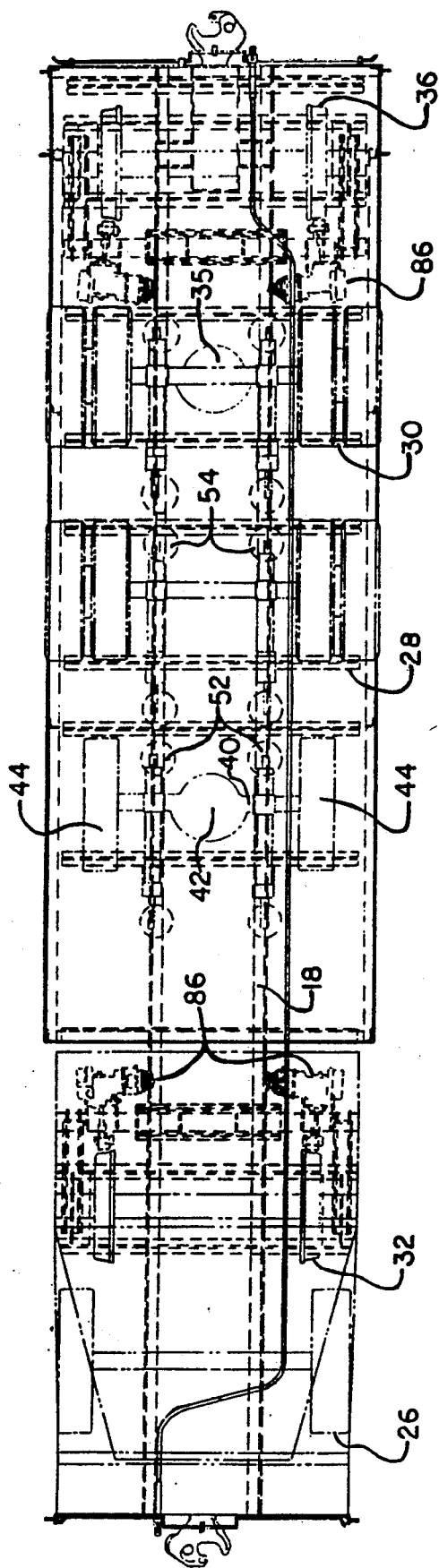
FIG. 2 is a plan view of the road/rails power vehicle of FIG. 1.

The road/rail power vehicle 10 as illustrated in FIG. 1 for example includes a suitable operator's cab 14 and a forwardly mounted drive engine 16. The vehicle includes a sturdy elongated main frame 18 to which is mounted a flat deck 20 for carrying any desired equipment, with a centrally mounted crane assembly 22 being illustrated by way of example although other types of equipment may be used if desired.

The elongated frame or chassis 18 is provided with a multiplicity of wheel and axle sets located at positions spaced along the length of the vehicle frame with the various wheel and axle positions being designated by position numbers 1 through 6 as shown in FIG. 1.

When in the highway mode, the power vehicle runs on the front steering axle and road wheel set 26. This axle and wheel set 26 is of a standard or conventional nature as is typically found on a highway tractor unit. This wheel and axle set is mounted to the vehicle frame 18 via a conventional spring suspension assembly (not shown). Further, in the highway mode, the power vehicle runs or is supported on a pair of dual wheel axle sets located at position numbers 4 and 5 as shown on FIG. 1. These dual wheel axle sets are designated by reference numbers 28 and 30 respectively. The dual wheel and axle set 30 is mounted to the vehicle frame by a suspension assembly 31 to be described hereinafter and, located in the center of the drive axle is a standard differential drive gear assembly 35 which is connected to a highway drive shaft 36 which extends from transfer gear box 37. The transmission (not shown) is connected directly to the engine, with a short drive shaft between the transmission and the lower input to the transfer gear box. The transfer gear box 37 is used to provide for connection to either the highway drive shaft or the rail drive shaft. The other dual wheel and axle set 28 located at position 4 need not be described in detail. It is simply a set of idler wheels arranged with a suspension assembly 32' to share the loadings in the highway mode of use thereby to comply with applicable regulations. In the case of a vehicle designed to meet requirements in Saskatchewan, the axle loadings in the configuration shown are 12,000 pounds on the front axle and road wheel set 26 and 16,000 pounds on each of the dual wheel and axle sets 28 and 30 thereby providing a gross vehicle weight of 44,000 pounds consistent with the maximum allowable limits for class two highways and secondary roads in the province of Saskatchewan.

For use in the rail mode, three additional rail wheel and axle sets 32, 34 and 36 are provided located at wheel positions 2, 3 and 6 as shown in FIG. 1. In the rail mode the rail wheel and axle sets 32, 34 and 36 are lowered downwardly into contact with the rails and the dual wheel and axle sets 28 and 30 for road use are retracted upwardly. The front steering axle and road wheel set 26 is raised clear of the rail by the lifting action of the rail wheel sets. The leading and trailing rail wheel and axle sets 32 and 36 are standard 33" diameter steel railway wheels which provide guiding action for the rail operation. These wheels are not powered and do not generate any tractive effort. The remaining rail drive and axle set 34, however, includes a driven axle 40 incorporating a truck differential gear 42 driven by rail drive shaft 43 from the transfer gear box 37. This rail wheel and axle set 34 incorporates a pair of rail drive wheels 44 having solid rubber tires which contact the rails to provide the required degree of tractive effort.

It was noted above that in the case of Saskatchewan, the gross vehicle weight is a maximum of 44,000 pounds. To ensure the maximum possible tractive effort when in the rail mode, it was imperative that the permissible vehicle weight of 44,000 pounds be reached. Thus, as one feature of the invention, the positioning of equipment on the chassis and the positioning of the various axles had to be determined so that each axle was carrying its allowable load limit without exceeding it In the rail mode, it was considered desirable to have the front and rear rail wheel and axle sets 32 and 36 carrying roughly equal loadings while permitting as much load as possible to be carried by the rail drive wheels 44.

Accordingly, the driven axle 40 for rail drive wheels 44 is positioned to coincide substantially with the longitudinal center of gravity of the entire power vehicle 10 when in the rail mode. With the positions of all of the wheel sets having been determined to meet the criteria noted previously, the vehicle can change from one mode of operation to the other without adjusting weight or ballast and without exceeding highway weight restrictions in the highway mode while permitting as much load as possible to be carried by the driving axle 40 and rail wheels 44 thereby to provide maximum tractive capability.

The mechanical details of the suspensions for the front and rear rail wheel and axle sets 32 and 36 as well as the suspension for the driven rail wheel and axle set 34 will be described in further detail later on. It is sufficient for the moment to state that in the rail mode, the loadings on the front rail wheel and axle set 32 are carried by a pair of air bag suspension springs 50. Insofar as the driven rail wheel and axle set 34 is concerned, the loadings are transmitted to the vehicle frame 18 via a similar pair of air bag suspension springs 52 while for the rear rail wheel and axle set 36, the loadings are carried by a pair of air bag suspension springs 56. All of these items are illustrated in the schematic diagram of FIG. 10. This schematic illustrates the various valve means associated with the air bag suspension units thereby to enable loadings carried by the front and rear rail wheel and axle sets 32, 36 to be controlled as the loading applied to the rail drive wheels 44 is varied. The reasons behind this will be more readily apparent from the following discussion.

Figure 10:
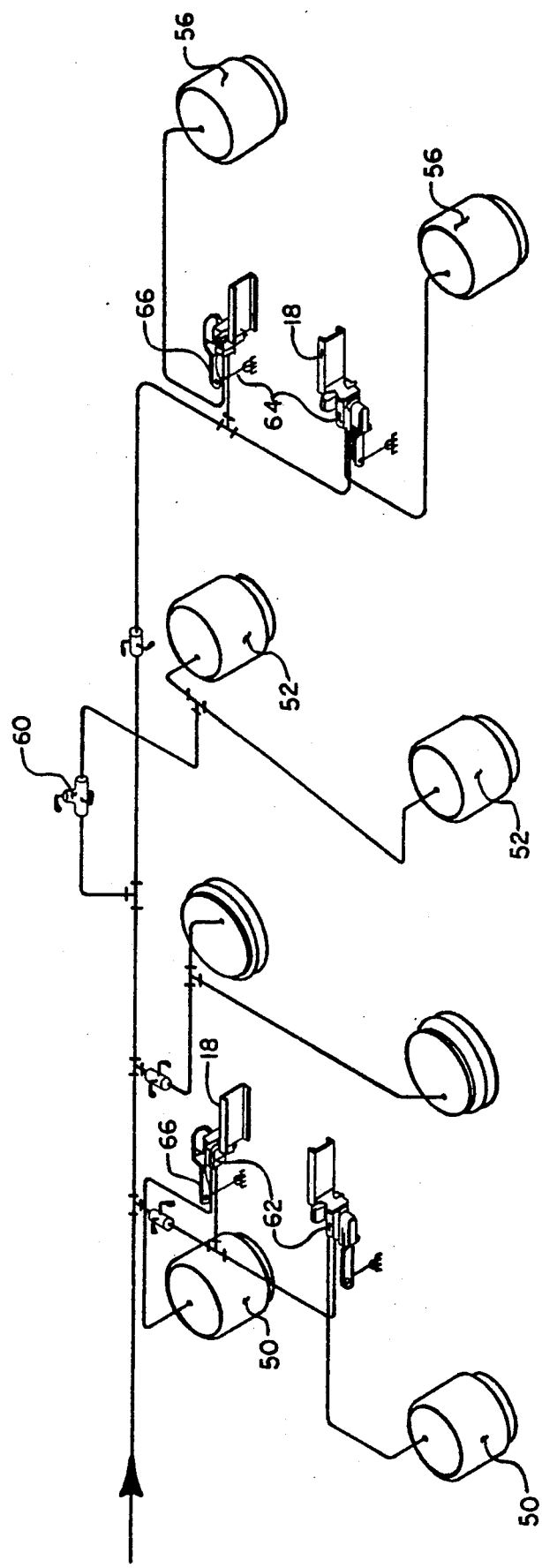
FIG. 10 is a schematic diagram of the air suspension system for the rail drive wheels and the front and rear rail wheel and axle sets.
Figure 11:
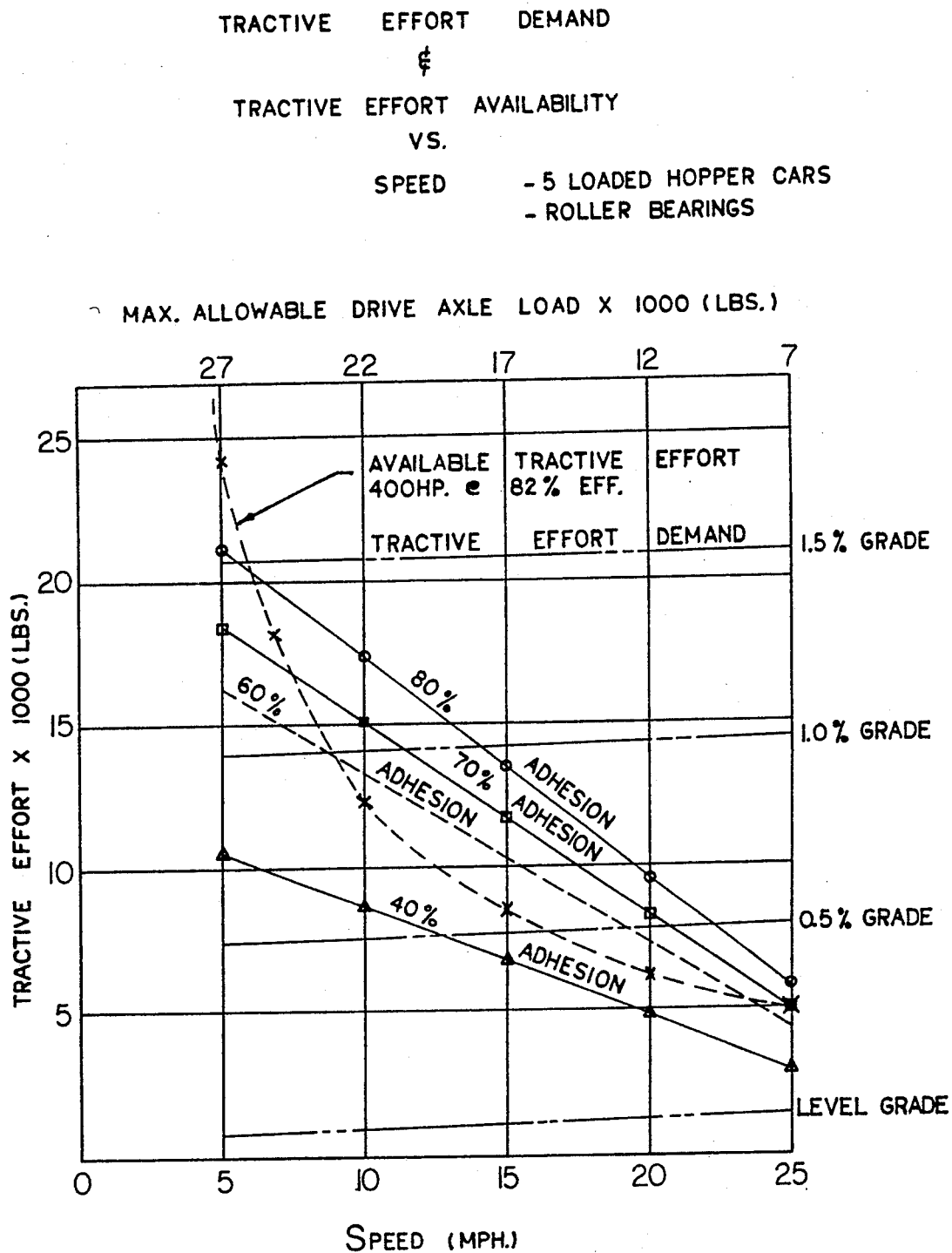
FIG. 11 is a graph showing tractive effort demand/tractive effort availability versus speed.

As noted previously, in order to maximize the available adhesion and tractive effort, solid rubber tires were chosen for the rail drive wheels 44 instead of the more conventional steel wheels associated with railway equipment. Because of the inherent properties of rubber, a wheel under a given load generates increasing amounts of internal heat as the rolling velocity increases. For this reason, the permissible load on the rubber wheel decreases as the vehicle speed increases. Also, the rate of wear due to abrasion increases with increasing speed. Accordingly, the system illustrated in FIG. 10 provides an arrangement whereby the load on the driven axle 40 and its rail drive wheels 44 can be varied such that at start-up and low speed operation the loads can be relatively high to maximize available tractive effort, but as the speed of the power vehicle increases, the loadings on the rubber tired rail drive wheels 44 can be decreased to reduce both the amount of heat generated and the wear rate and to better match the horsepower torque curve as illustrated in FIG. 11. Accordingly, the air pressure supply to the air bag suspension units 52 associated with rail drive wheels 44 can be increased or decreased at will by means of a variable pressure reducing valve 60 which is located in the cab for easy access by the operator.

Because the rail drive wheels 44 essentially form a redundant third support point between the front and rear rail wheel and axle sets 32 and 36, it was established that if leveling valves (height control valves) were utilized on the air bag springs 50, 56 for these railway wheel sets, the load carried by the rubber tired rail drive wheels 44 could be varied by directly controlling the pressures of the air springs in the suspension system. Accordingly, as shown in FIG. 10, two pairs of height control valves 62 and 64 are provided, all of these height control valves being mounted to the vehicle frame 18. Each height control valve includes a control lever 66 connected by a suitable link to a point on the associated axle suspension system (bogie) such that as the axle moves upwardly or downwardly relative to the vehicle frame 18, the control lever is pivoted. As the control lever 66 is pivoted, it actuates the height control valve associated with it so as to increase or decrease the amount the air pressure within the associated air bag spring 50, 56. Hence, as the pressures in air bag springs 52 are increased by the operator (by controlling the valve 60), and the rail drive wheels 44 tend to carry more of the vehicle weight, the leveling or height control valves 62, 64, associated with the rail wheel and axle sets 32 and 36 sense the increasing height and automatically start to decrease the air pressure in the air springs 50, 56, under their control. More load is thereby carried by the driven axle and its rail drive wheels 44. Reducing the pressure on the rail drive wheels will cause similar reactions in the opposite direction. Again, by virtue of the position of the front and rear rail wheel and axle sets 32, 36, relative to the center of gravity of the power vehicle, the loads on these front and rear sets 32, 36 stay relatively equal to each other throughout the full range of load transfer.

The above-noted leveling or height control valves 62, 64, are well known per se in the trucking industry as for example NEWAY Part No. 900-54-007.

FIG. 11 is of interest in illustrating tractive effort demand and tractive effort availability versus speed wherein the load being pulled involves five loaded hopper cars each equipped with the standard roller bearings. Thus it is predicted that at high speed (25 mph) and low adhesion demand situations, the rubber tired rail drive wheels 44 can be off-loaded to as low as 4,000 pounds with the rail wheel and axle sets 32 and 36 carrying loads of 21,000 and 19,000 pounds respectively. In low speed and high adhesion demand situations, the loading on the solid rubber rail drive wheels 44 can be increased to as high as 27,000 pounds to provide maximum tractive effort but it is predicted that for the usual starting and grade operations, the drive wheels would be loaded only to about 18,000 pounds resulting in front and rear rail wheel loadings of 12,500 and 13,500 pounds respectively. Accordingly the system described enables the operator to load the rubber tired rail drive wheels 44 only to the extent necessary to provide sufficient traction for the conditions being encountered thereby minimizing wear and heat generation and maximizing the life of the rubber tires.

The front and rear rail wheel and axle sets 32 and 36 are mounted to the vehicle frame 18 by means of specially designed bogies 70 only one of which need be described as they are identical to each other in construction.

The railway bogie 70 has been designed to use a standard railway wheel and axle set with 33" diameter wheels and 6"×11" roller bearings. It is arranged such that each wheel and axle set (32, 36), when not required, can be raised five (5) inches above the road surface. When the bogie is lowered into operating position, it will carry the vertical load of the vehicle and the loads due to brake forces, as well as provide enough degrees of freedom for movements due to bounce, roll, pitch and track twist.

The bogie (FIGS. 6-9) consists of two major fabricated assemblies, namely the bogie frame 72 and the drag link beam 74. The bogie frame 72 is a "C" shaped assembly comprised of two side frame assemblies 76 disposed in flanking relation to the vehicle frame and connected by a cross shaft 78. The outer ends 80 of the side frame assemblies 76 (i.e. the tips of the "C") are designed to fit onto a standard railway wheel pair by placing them over the journal bearings on each end of the wheel pair. Two standard AAR narrow pedestal bearing adaptors 82 (one for each journal bearing) are used to provide the interconnecting interface between the side frames and the roller bearings. A lower connecting strap 84 (FIG. 1) is then bolted to each side of the opening in each frame to secure the journal bearings in place. A rubber pad (not shown) bonded to the lower connecting straps, serves to prevent upward movement of the side frames 76 relative to the journal bearings and to provide a cushioned support for the wheel pair when in the raised position.

Fixed to the interconnecting cross shaft 78 are suitable brackets to accept the tread brake cylinder units 86 (FIG. 1). The brake cylinder units 86 themselves are well known proprietary items such as supplied by Wabco of Stoney Creek, Ontario and the method of attachment is in accordance with their recommendations. Also attached to the cross shaft 78 are two levers 88. The cross shaft 78 forms the pivot for the raising and lowering operation of the retractable wheel set, which is accomplished by hydraulic cylinder 90 acting against the free ends of these levers fixed to the cross shaft 78.

The top flange 92 of the side frame assemblies 76 are designed to form the mounting base for the previously noted air bag spring assemblies 52, 56 which react against vehicle frame transverse assembly 93 to support the weight of the vehicle. Holes are drilled to the appropriate pattern to accept the mounting bolts for the air spring assemblies.

Figure 9:
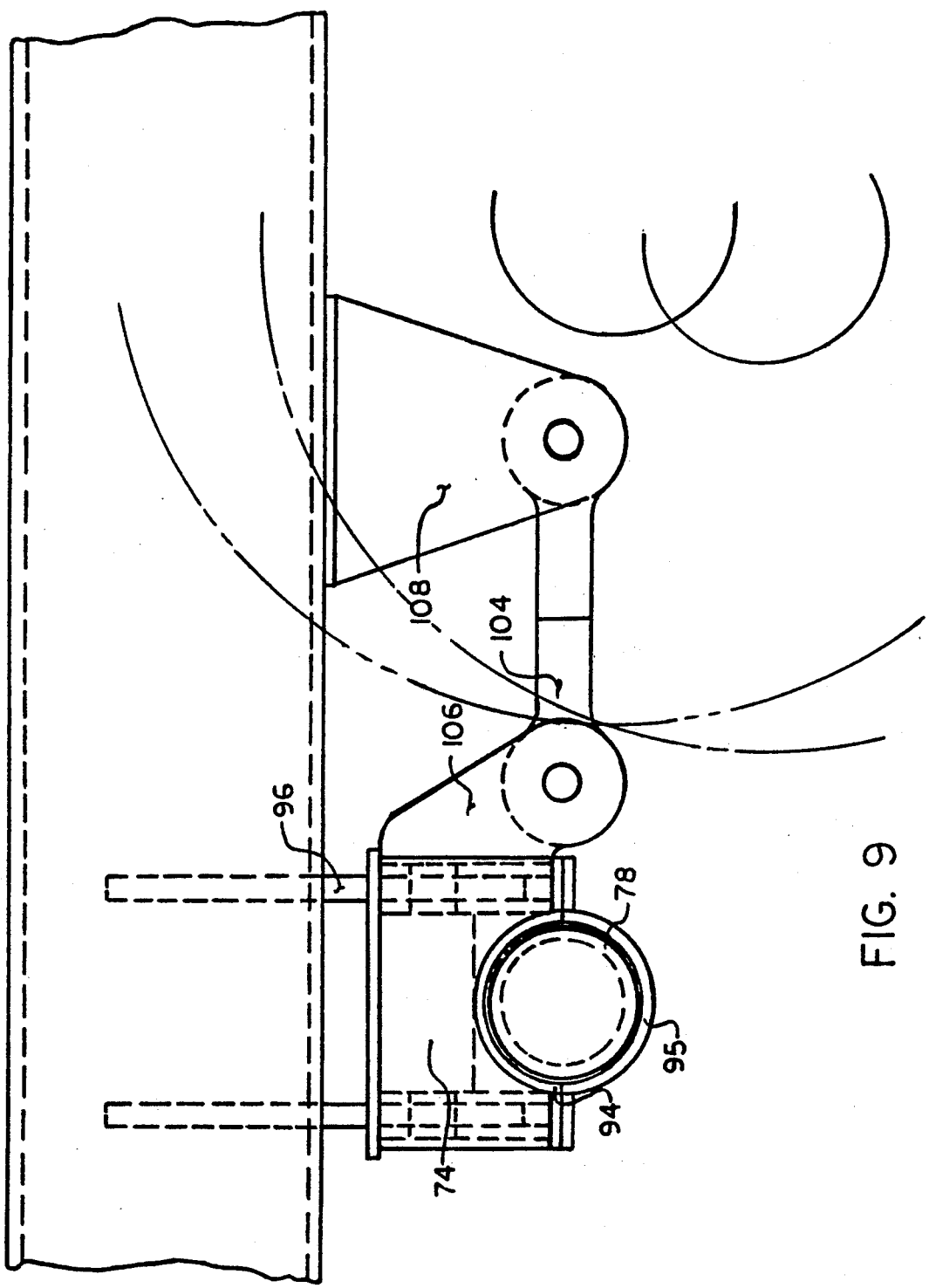
FIG. 9 is a side elevation view of the beam and drag link assembly.

The cross shaft 78 (which forms the horizontal pivot) fits into the drag link beam 74 and is seated in two half bearing shells 94 (FIG. 9). A lower bearing cap 95 fits over the cross shaft 78 at each bearing location, securing the cross shaft to the drag link beam 74.

The drag link beam 74 is secured to the vehicle frame 18 at three locations. At the center of the beam 74, two ears 96 projecting from the lower edges of a vehicle frame transverse member 98 protrude through parallel slots in the beam top cover plate 100. Two pins 102, running longitudinally of and centrally to the vehicle, are inserted, one from each side of the beam 74, passing through the beam and the protruding ears 96 to firmly connect the drag link beam 74 to the vehicle frame 18. This provides a center pivot which allows for relative movement between the bogie 70 and the vehicle frame 18 about a longitudinal axis such as for roll motion of the vehicle and for track twist encountered when negotiating cant gradients and other track irregularities.

The drag link beam 74 is further connected to the vehicle chassis 18 by means of two drag links 104 (FIG. 9), one located adjacent each end of the beam 74, and running longitudinally toward the associated rail wheel pair. These links 104 serve to hold the drag link beam 74 and therefore the bogie frame and wheel pair perpendicular to the vehicle chassis. Because the links 104 are connected by pins at each end (by brackets 106 on the beam and brackets 108 on the vehicle frame) they permit relative roll movement via the center longitudinal pin 102 connection during roll and track twists but still serve to hold the drag link beam 74 and hence the bogie in proper alignment.

During relative movement about the longitudinal axis between the vehicle frame and the bogie 70, the drag links 104 scribe an arc which in effect slightly varies the horizontal distance between the pin centers on the beam and chassis brackets 106 and 108. The drag links 104 are therefore applied in a horizontal position so that the portion of arc through which they travel has the least effect on changes to the horizontal distance. Thus, during roll, or when encountering an irregularity in track cross level, one link will move upward from the neutral horizontal position while the other link will move downward a corresponding distance. This shortens the horizontal distance between pin centers on each link 104 an equal amount, thereby maintaining the bogie and wheel pair in perpendicular position, the difference in distance being taken up by a small amount of play in the pivot pins.

Reference was made briefly to the suspension assemblies 32', 31 and 31' for the dual road wheel and axle sets 28 and 30 and for rail drive set 34. Essentially, these suspension assemblies may be commercially available "Neway" axle suspensions incorporating rearwardly extending beams 120 having their forward ends pivoted to brackets 122 secured to the vehicle frame while the rearward or trailing ends are secured to the previously noted air bag suspension units 52, 54 also typically made by Neway. This standard suspension, however, is modified in each case by the addition of forwardly extending lift arm extensions 124 with a lifting air bag 126 interconnected between the forward end of each extension and the vehicle frame so that as air pressure is applied to the lifting air bags 126 and air pressure is released from the air bag suspension units 52, 54, the highway wheels or rail drive wheels are retracted upwardly.

Figure 3:
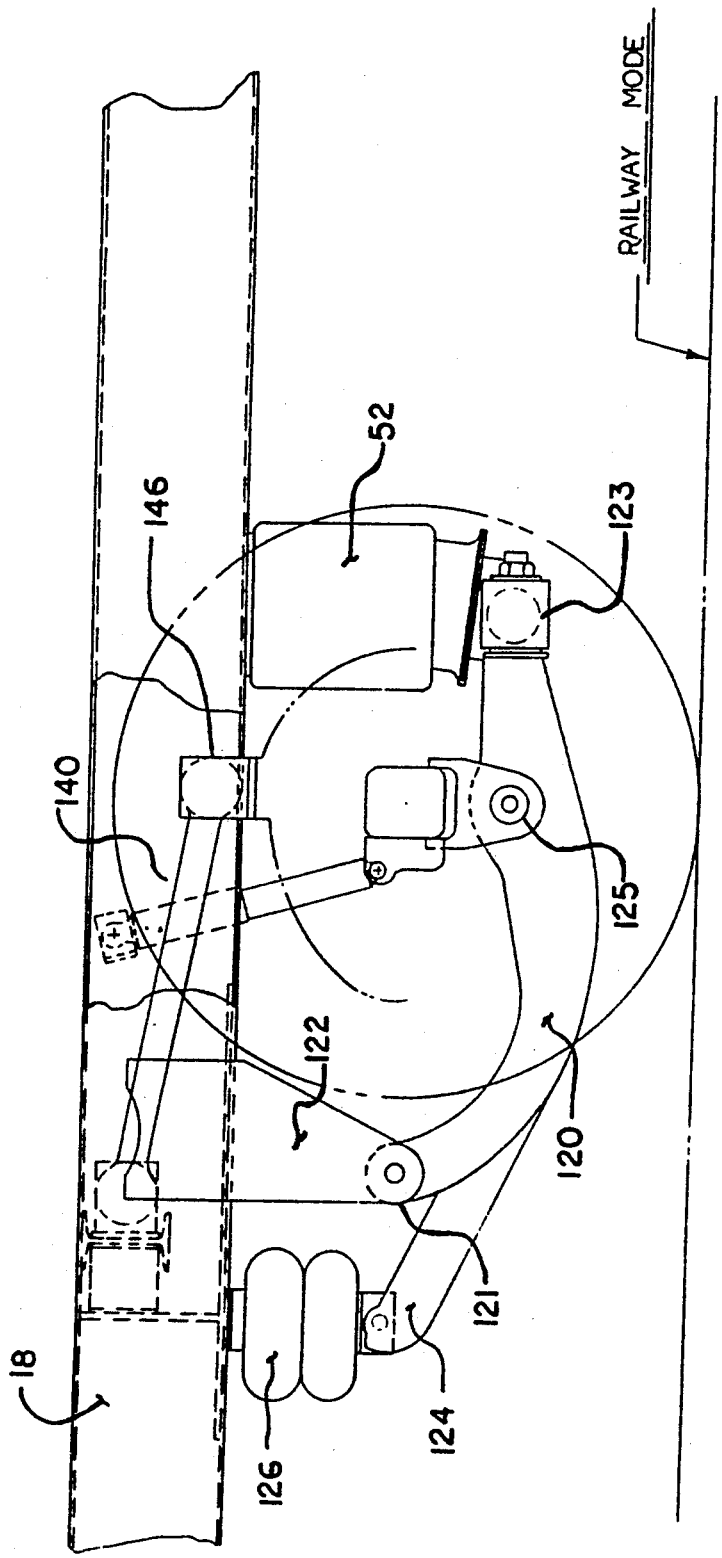
FIG. 3 is a side elevation view of the rail drive wheel and axle and its suspension system.
Figure 4:
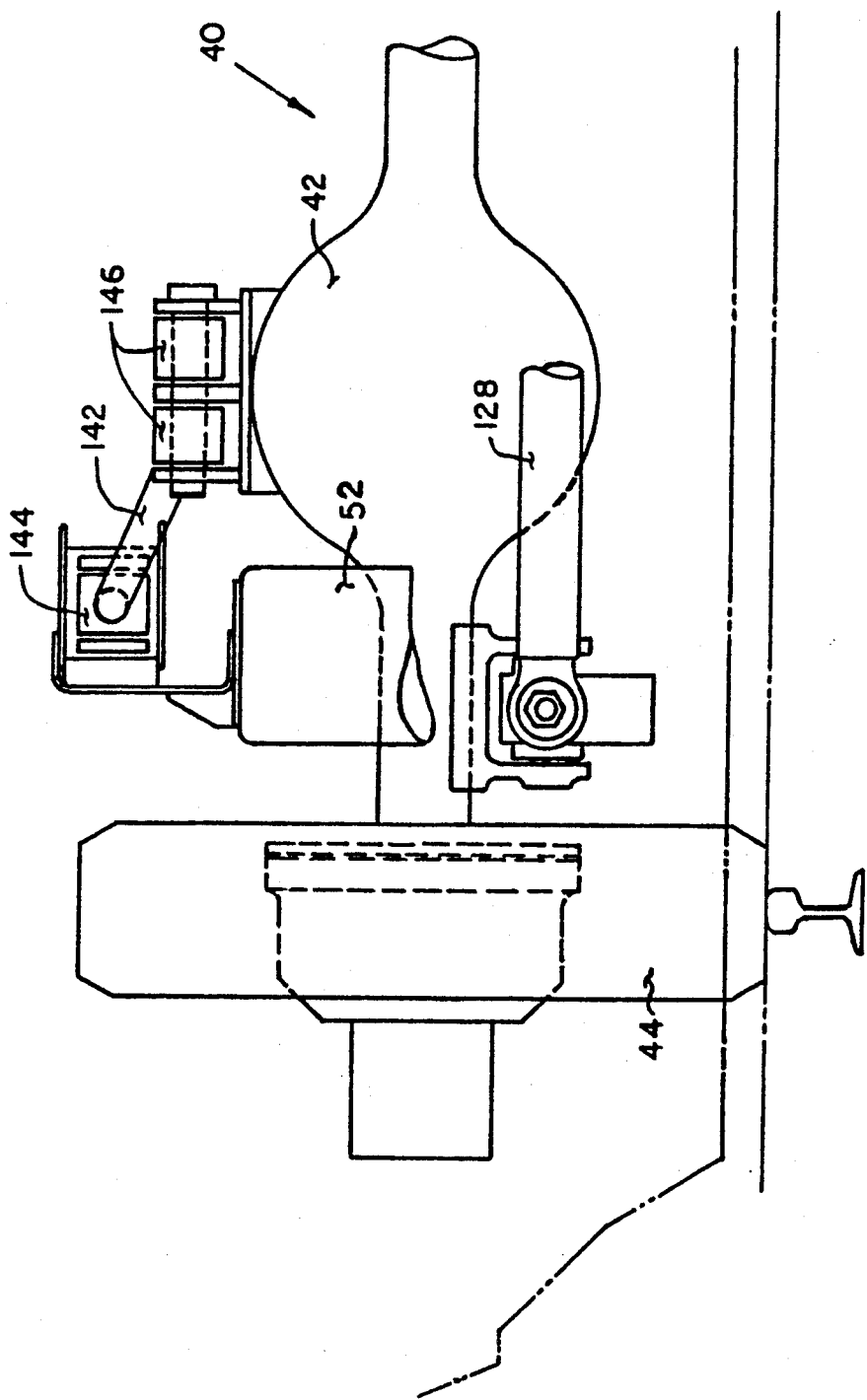
FIG. 4 is a partial rear end elevation view of the rail drive wheel, axle and suspension system.
Figure 5:
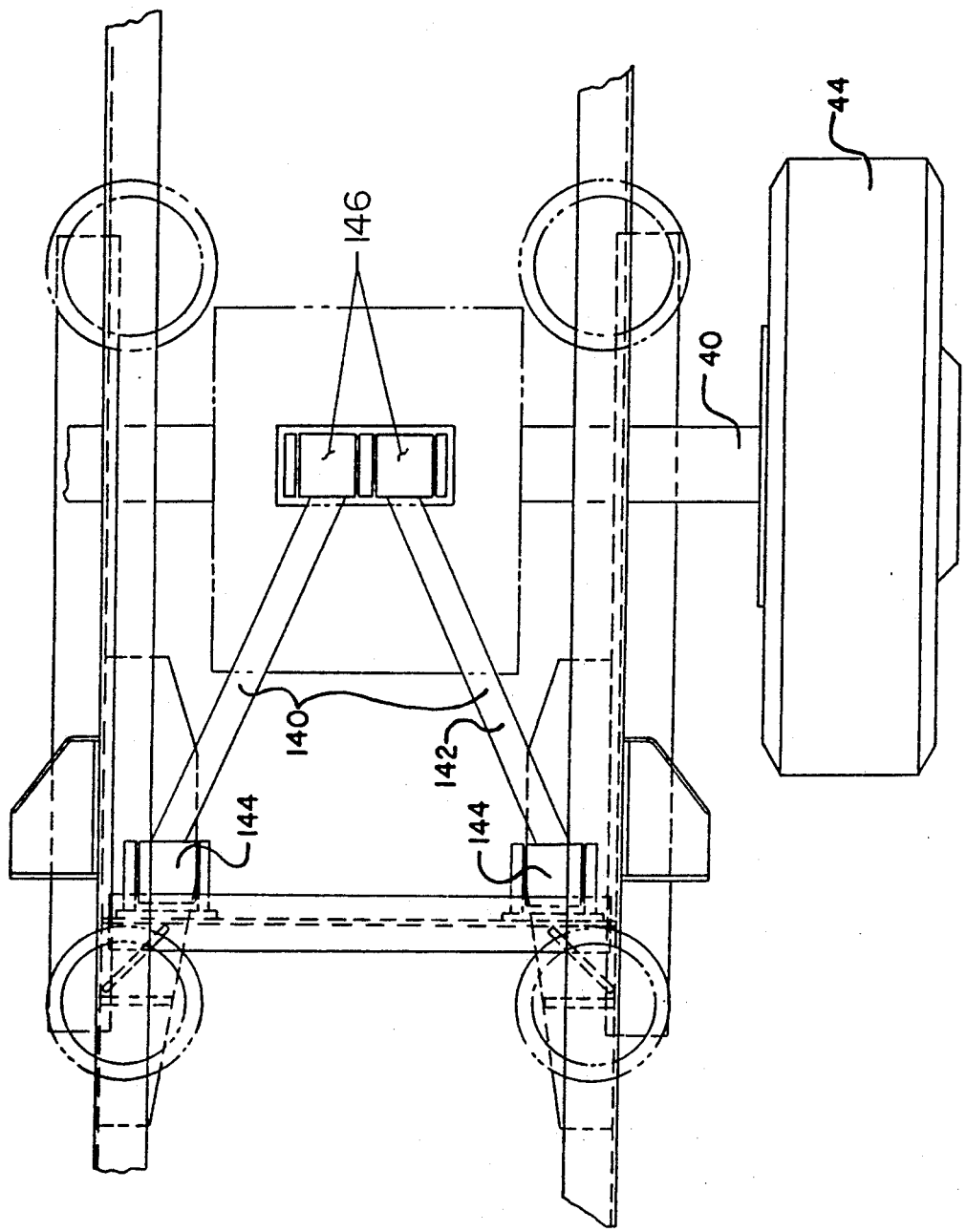
FIG. 5 is a plan view, partly in phantom with portions omitted, of the rail drive wheel, axle and suspension system.
Figure 6:
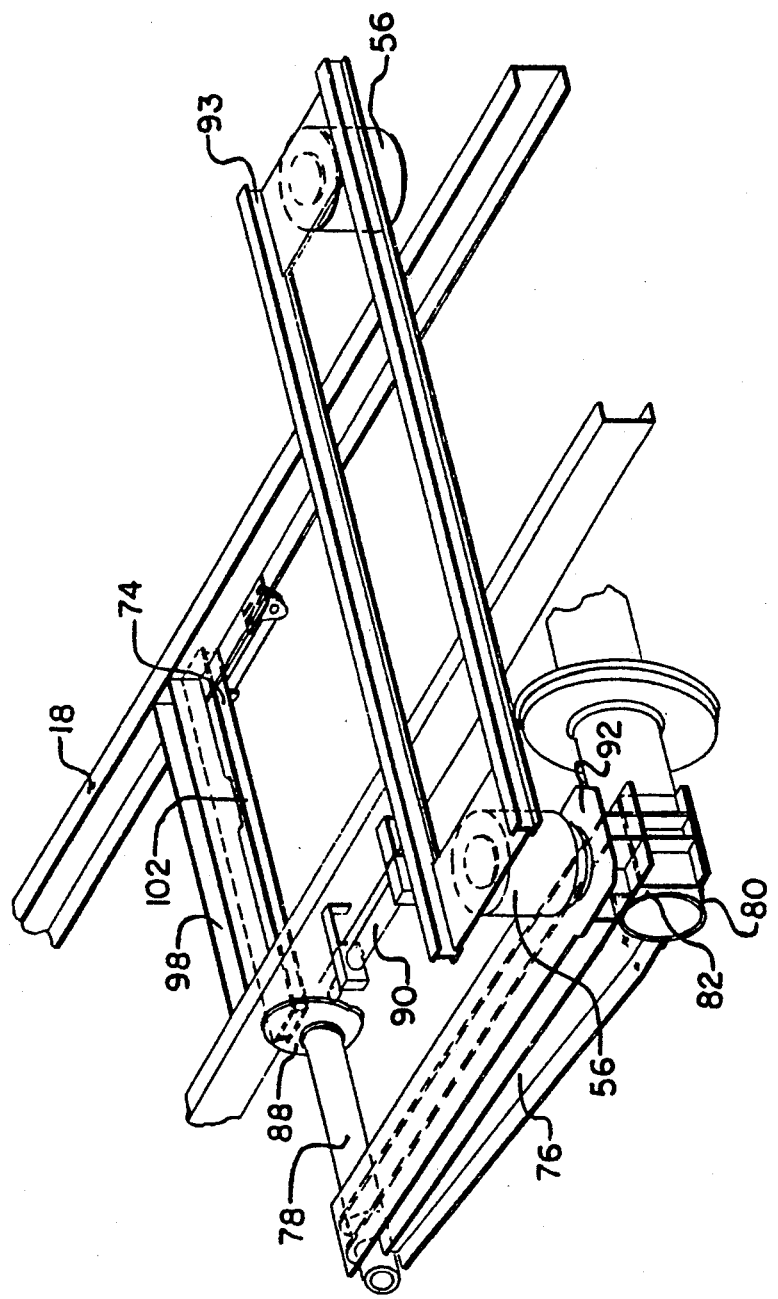
FIG. 6 is a perspective view of the rail wheel bogie assembly for the front and rear rail wheel and axle sets.
Figure 7:
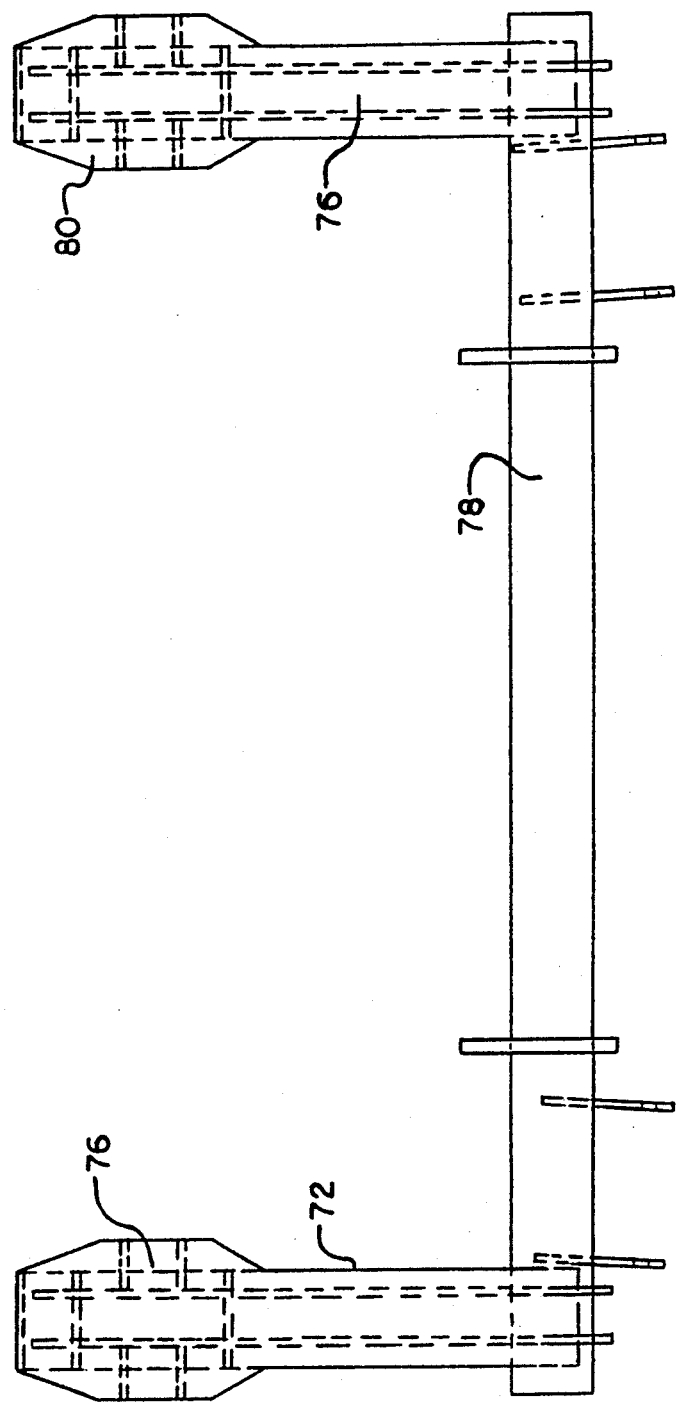
FIG. 7 is a plan view of the bogie cross-shaft and side frame assembly.
Figure 8:
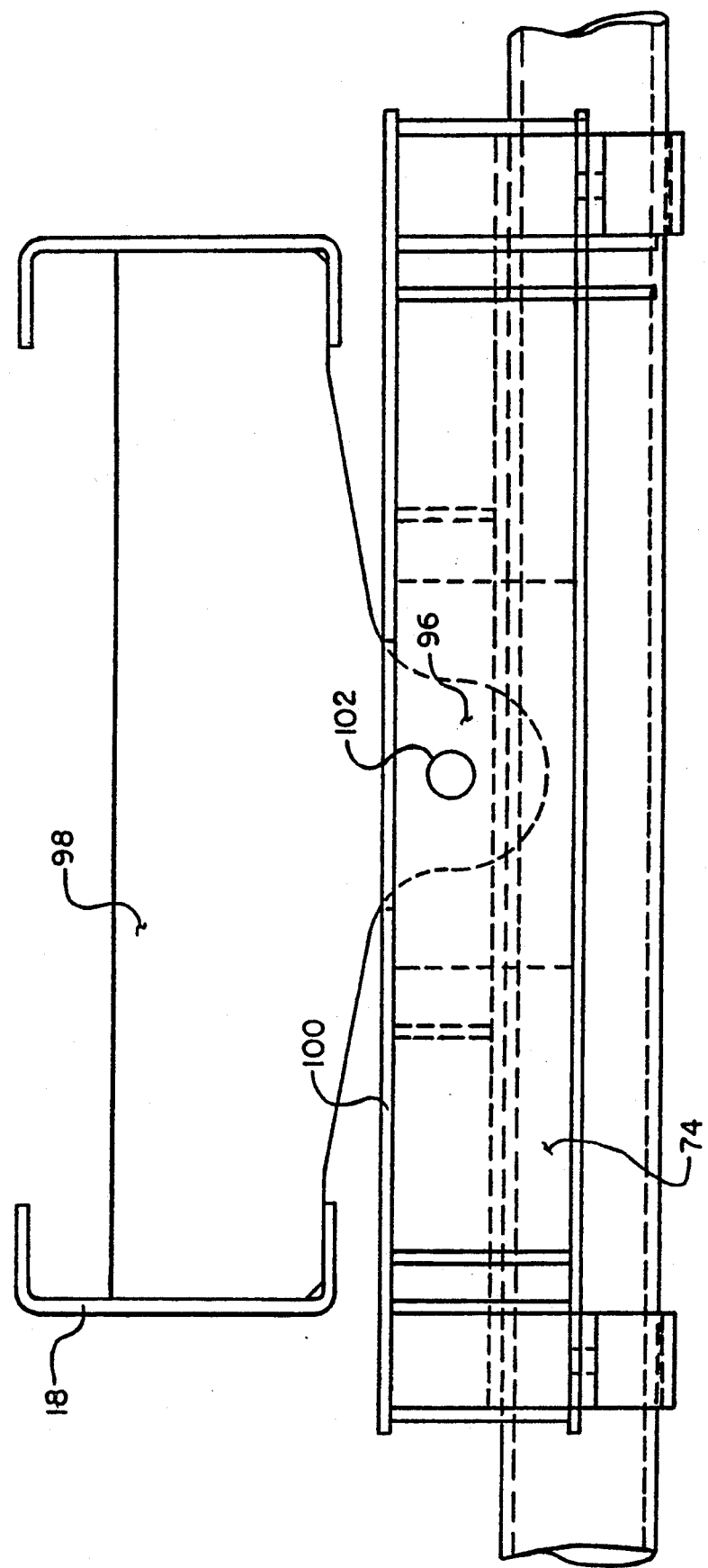
FIG. 8 is a section view taken along line 8-8 of FIG. 6 showing the longitudinal pivot means.

With reference now to FIGS. 3-5, it was previously noted that the rail drive wheels 44 are mounted to opposing ends of drive axle 40. This drive axle 40 includes the differential gear 42 including a suitable housing. The drive engine is operatively connected by way of the transfer gear box 37 and the drive shaft 43 to the differential gear 42.

The suspension for the drive axle 40 of the Neway type noted previously incorporating a pair of laterally spaced rearwardly extending beams 120 pivotally connected at their forward ends 121 to brackets 122 fixed to the vehicle frame 18. These beams therefore are capable of a generally vertical swinging motion. The previously noted air bag suspension springs 52 are interposed between the trailing ends 123 of beams 120 and the vehicle frame 18. A transverse stabilizer bar 128 connected between the trailing ends of beams 120 is also provided. The drive axle 42 also is connected by way of a pivotal connection 125 with each beam intermediate the forward and trailing ends of same. Each beam is also provided with a forwardly extending lifting arm 124 as described previously with a Neway lifting air bag 126 being connected between the forward end of the lifting arm and the vehicle frame thereby to effect lifting of the rail drive wheel and axle set 34.

The unique torque arm assembly 140 is located above and spaced from the aforementioned beams 120. This torque arm assembly is pivotally connected intermediate the drive axle and the vehicle frame and is so located and arranged as to react torque loadings on the drive axle both longitudinally and transversely of the vehicle frame. At the same time this wishbone torque arm assembly 140 permits the drive axle to be raised and lowered to provide the two modes of operation as described previously. With reference to FIGS. 3-5, it will be seen that this torque arm assembly 140 includes a pair of arms 142 having their forwardly disposed ends pivotally connected to the vehicle frame at laterally spaced apart pivot connections 144 which as will readily be seen are disposed a substantial distance above the pivot connections at the beam forward ends 121. These arms 142 converge toward each other rearwardly and are connected to the top of the differential gear housing at closely spaced pivot connections 146, which pivot connections are spaced a substantial distance above the pivotal connections between the beams 120 and the drive axle. FIG. 4 shows that the pivot connection 144 at the rearward ends of the torque arms is defined by a pivot bracket affixed to the differential gear housing. It is disposed substantially at the longitudinal center line of the vehicle frame. The overall geometry, as best seen in FIG. 3, is such that as the drive axle 40 is raised and lowered, the angular position of the axle and the differential housing remains approximately constant.

The above description applies also to the road drive wheel and axle set 30 and the arrangement is the same as in FIGS. 3-5 except that the rail drive wheels 44 are replaced with road drive wheels. Hence, the operation of the rail and highway drive shafts 36 and 43 and the universal joints thereon are not adversely affected by changes in the height of the drive axles relative to the vehicle frame.

The overall manner of operation of the road/rail vehicle will be readily understood from the foregoing description and need not be described further here. It will be appreciated that conversion from the rail mode to the road mode of operation and vice versa is quick and easy and may be essentially performed from the operator's cab. The several advantages of the equipment described over the known prior art arrangements will be readily apparent to those skilled in the art. While a single preferred embodiment of the invention has been described, various modifications and changes falling within the scope of the invention will be apparent to those skilled in the art in light of the description given herein.

I claim:

1. A convertible road/rail power vehicle including a vehicle frame, a group of road wheels mounted to said vehicle frame for road use; a group of rail wheels mounted to said vehicle frame for rail use; at least said group of rail wheels being movable between a lowered position wherein the weight of said vehicle is carried by the rail wheels in a rail mode and a raised position wherein the vehicle weight is carried by the road wheels in a road mode; some of said rail wheels being rail drive wheels; some of said road wheels being road drive wheels; drive engine and power transmission means selectively connectable to either said rail drive wheels or said road drive wheels; said rail drive wheels being located sufficiently close to the longitudinal center of gravity of said vehicle as to enable a substantial amount of the total vehicle weight to be applied to said rail drive wheels to enable the latter to provide a desired amount of tractive effort, and wherein said group of rail wheels includes front and rear sets of rail wheels, said rail drive wheels being located intermediate the front and rear sets of rail wheels so the rail drive wheels provide, in use, a redundant support point between the support points provided by the front ad rear sets of rail wheels to enable the proportions of the loadings carried by the front and rear sets of rail wheels and the rail drive wheels to be controlled, fluid pressure activated means to move at least the rail drive wheels into contact with the rails to provide tractive force and means to selectively control the amount of force said fluid pressure activated means applies to the rail drive wheels when in contact with the rails to increase or decrease the total loading on the rail drive wheels and the tractive effort the rail drive wheels are capable of exerting.

2. The vehicle according to claim 1 wherein said fluid pressure activated means is operative to move both said rail drive wheels and said front and rear sets of rail wheels between said raised and lowered positions, and valve means associated with the fluid pressure activated means for said front and rear sets of rail wheels to enable the loadings carried by said front and rear sets to be controlled as the loading applied to said rail drive wheels is varied.

3. The vehicle according to claim 1 wherein said fluid pressure activated means comprises air spring means.

4. The vehicle according to claim 1 wherein said rail drive wheels employ solid rubber tires to help provide the required tractive effort.

5. The vehicle according to claim 1 wherein said rail drive wheels are located substantially at the longitudinal center of gravity of said vehicle with the remaining rail wheels being located on the vehicle so as to enable them to share substantially equal proportions of the vehicle weight.

6. The vehicle according to claim 2 wherein said valve means comprises vehicle one of leveling and height control valves arranged to enable the from and rear sets of rail wheels to carry selected proportions of the total loadings as the loading applied to the rail drive wheels is varied.

7. A convertible road/rail power vehicle including an elongated vehicle frame; a plurality of road wheels mounted to said frame for road use; a plurality of rail wheels mounted to said frame for rail use; fluid activated suspension means for moving at least said rail wheels between a retracted position wherein the vehicle weight is carried by said road wheels and an extended position wherein the vehicle weight is carried by said rail wheels; said rail wheels including sets of front and rear rails wheels and a set of rail drive wheels located intermediate said sets of front and rear rail wheels to provide, in use, a redundant support point between the support points provided by the sets of front and rear rail wheels to enable the proportions of the vehicle weight carried by the sets of front and rear rail wheels and the set of rail drive wheels to be varied and controlled, means associated with the fluid activated suspension means to control and vary the weight carried by the rail drive wheels, a drive engine and transmission operatively connectable via a drive train to said rail drive wheels or to certain of said road wheels and further means for controlling aid fluid activated suspension means comprising one of leveling and height control valves for sensing changes in height between said front and rear rail wheel sets and the vehicle frame and responding to these changes to control the proportions of the vehicle weight being borne by said front and rear rail wheel sets as the amount of vehicle weight borne by said rail drive wheels is controlled and varied.

8. The vehicle of claim 7 wherein said rail drive wheels are located approximately at the center of gravity of the entire vehicle with said front and rear rail wheel sets being positioned to permit them to share approximately equal proportions of the vehicle weight.

9. The vehicle of claim 7 wherein said fluid activated means includes air bag suspension means associated with each of said sets of front and rear rail wheels and said rail drive wheels.

10. The vehicle according to claim 9 wherein said rail drive wheels have solid rubber tires to enhance the tractive effort the rail drive wheels are capable of providing.

11. A convertible road/rail vehicle including an elongated vehicle frame; a plurality of road wheels and axles mounted to the vehicle frame for road use; a plurality of rail wheel and axle sets mounted to the vehicle frame for rail use; at least one of said rail wheel and axle sets being mounted to the vehicle frame by a bogie permitting the rail wheel and axle set to be raised and lowered to provide a road use mode and a rail use mode respectively; said bogie including side frames having bearings journalling opposing ends of the associated rail wheel and axle set; means defining a pivot axis transverse to the vehicle frame to allow the side frames to pivot and move the rail wheel and axle set between said raised and lowered positions, and further means to permit said side frames to pivot about a longitudinal axis relative to the vehicle frame, pivot link means between the vehicle frame and said bogie to stabilize the bogie relative to the vehicle frame; suspension spring means acting between portions of the vehicle frame and said side frames to transmit vehicle weight to the wheel and axle set.

12. The vehicle of claim 11 wherein said pivot link means are located on opposing sides of the means permitting pivoting about said longitudinal axis and are adapted to maintain alignment of the side frames and the rail wheel and axle set during relative pivotal motion about said longitudinal axis between said vehicle frame and said side frames.

13. The vehicle of claim 11 wherein hydraulic lift cylinders are operatively connected to effect pivoting of said side frames to effect raising and lowering of the rail wheel and axle set.

14. The vehicle of claim 13 wherein said suspension spring means comprises air bag suspension means.

15. A convertible road/rail vehicle including an elongated vehicle frame; a plurality of road wheels and axle sets mounted to the vehicle frame for road use; a plurality of rail wheel and axle sets mounted to the vehicle frame for rail use; at least one of said rail wheel and axle sets being mounted to the vehicle frame by a bogie permitting the rail wheel and axle set to be raised and lowered to provide a road use mode and a rail use mode respectively; said bogie including a spaced apart pair of elongated side frames located in flanking relation to the vehicle frame, first ends of said side frames supporting respective bearings for journalling opposing ends of the wheel and axle set, and a cross-shaft being fixed to opposing ends of said side frames and extending transversely of the vehicle frame, and a beam assembly journalling said cross-shaft to permit said side frames to pivot as the wheel and axle set is raised and lowered, central pivot means defining a longitudinally extending pivot axis connecting said beam assembly to the vehicle frame and permitting relative movement in the roll direction between the vehicle frame on the one hand and said bogie and wheel and axle set on the other hand, pivot link means extending between and connecting said beam assembly to said vehicle frame to stabilize the beam assembly, cross-shaft and side frames relative to the vehicle frame, and suspension spring means acting between portions of the vehicle frame and said first ends of the side frames to transmit vehicle weight through to the opposing ends of the wheel and axle set.

16. The vehicle of claim 15 wherein said pivot link means include a pair of generally horizontally disposed links which extend in the lengthwise direction of the vehicle frame in transversely spaced apart relation on opposing sides of the central pivot means so that during said relative movement in the roll direction one of the pair of links will pivot upward from a neutral horizontal position while the other pivots downward therefrom by a corresponding distance thereby preventing skewing of said beam assembly, cross-shaft and side frames relative to the vehicle frame.

17. The vehicle of claim 15 wherein said suspension spring means comprises air bag suspension means.

18. The vehicle of claim 16 wherein said vehicle frame includes a transverse frame member which is connected to said beam assembly by said central pivot means.

19. The vehicle of claim 18 wherein said transverse frame member includes a pair of spaced apart ears which extend downwardly, and pin means located in said beam assembly and extending through apertures in said ears to define the central pivot axis.

20. The vehicle of claim 19 including hydraulic lift cylinders operatively connected to said cross-shaft to rotate the latter and effect the raising and the lowering of the rail wheel and axle set.

21. A convertible road/rail power vehicle including an elongated vehicle frame; a plurality of road wheels mounted to said frame for road use; a plurality of rail wheels mounted to said frame for rail use; fluid activated suspension means for moving certain of said wheels between a retracted position wherein vehicle weight is carried by said road wheels and an extended position wherein the vehicle weight is carried by said rail wheels; certain of said road wheels being a set of road drive wheels, said rail wheels including a set of rail drive wheels, a drive engine and transmission operatively connectable via drive train means to said rail drive wheels or to said road drive wheels, each of said sets of drive wheels being mounted to opposing ends of a drive axle including an intermediate gear housing, and a suspension for each said drive axle comprising a pair of laterally spaced rearwardly extending beams pivotally connected at their forward ends to the vehicle frame for generally vertical swinging motion and air spring means forming part of said fluid activated suspension means interposed between trailing ends of said beams and the vehicle frame, each said drive axle having a pivotal connection with an associated pair of said beams intermediate the forward and trailing ends thereof, and torque arm means located above and spaced from said beams and pivotally connected between each said drive axle and the vehicle frame and located and arranged so as to react torque loadings on said drive axles both longitudinally and transversely of the vehicle frame while at the same time permitting the drive axles to be raised and lowered as said beams pivot about their forward ends.

22. The vehicle of claim 21 wherein each said torque arm means includes a pair of arms having their forwardly disposed ends connected to the vehicle frame at laterally spaced apart pivot points disposed a substantial distance above the pivot connections at the beam forward ends, said arms converging toward each other rearwardly and being connected to said drive axle at pivot points spaced substantially above the pivotal connections between said beams and the drive axle and arranged so that as said drive axle is raised and lowered the angular position of the drive axle and its gear housing remains approximately constant.

23. The vehicle of claim 21 wherein forwardly extended lever arms are fixed to each of said beams, and further fluid actuated means interposed between forward ends of said lever arms and the vehicle frame so that on expansion thereof said beams are made to pivot about their forward ends to raise the drive axle and the drive wheels.

24. The vehicle of claim 22 wherein the pivot points at the rearward ends of said torque arms are defined by a pivot bracket fixed to said drive axle gear housing and disposed substantially at the longitudinal center line of the vehicle frame.

* * * * *

UNITED STATES PATENT AND TRADEMARK OFFICE
CERTIFICATE OF CORRECTION

PATENT NO. : 5,016,544

DATED : May 21, 1991

INVENTOR(S) : Ronald F. Woollam

It is certified that error appears in the above-identified patent and that said Letters Patent is hereby corrected as shown below:

On the title page, item [73], "Her Majesty the Queen in right of Canada, as represented by the Minister of Highways and Transportation" should be -- Her Majesty the Queen in Right of the Province of Saskatchewan, as Represented by the Minister of Highways and Transportation --.

Signed and Sealed this

Twenty-third Day of March, 1993

*Attest:*

STEPHEN G. KUNIN

*Attesting Officer*     Acting Commissioner of Patents and Trademarks